(12) United States Patent
Dietz et al.

(10) Patent No.: US 8,590,932 B2
(45) Date of Patent: Nov. 26, 2013

(54) ADJUSTABLE STEERING COLUMN FOR A MOTOR VEHICLE

(75) Inventors: Maximilian Dietz, Rorschach (CH); Tillmann Rutzel, Constance (DE)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 115 days.

(21) Appl. No.: 13/061,541

(22) PCT Filed: Aug. 10, 2009

(86) PCT No.: PCT/EP2009/005793
§ 371 (c)(1),
(2), (4) Date: Mar. 1, 2011

(87) PCT Pub. No.: WO2010/022855
PCT Pub. Date: Mar. 4, 2010

(65) Prior Publication Data
US 2011/0156380 A1   Jun. 30, 2011

(30) Foreign Application Priority Data
Sep. 1, 2008  (DE) .......................... 10 2008 045 143

(51) Int. Cl.
*B62D 1/184*  (2006.01)
*B62D 1/19*   (2006.01)

(52) U.S. Cl.
USPC .............................. 280/775; 280/777; 74/493

(58) Field of Classification Search
CPC ........................................................ B62D 1/18
USPC .......... 411/360, 371.2; 29/505; 280/777, 775; 74/493, 107, 527, 531
See application file for complete search history.

(56) References Cited

U.S. PATENT DOCUMENTS 5,377,555 A * 1/1995 Hancock ........................ 74/493
5,593,183 A * 1/1997 Fouquet et al. ............... 280/775
(Continued)

FOREIGN PATENT DOCUMENTS

DE   31 38 083   6/1982
DE   43 45 099   7/1995
(Continued)

OTHER PUBLICATIONS

International Search Report issued Oct. 28, 2009 in International (PCT) Application No. PCT/EP2009/005793.

*Primary Examiner* — Karen Beck
(74) *Attorney, Agent, or Firm* — Wenderoth, Lind & Ponack, L.L.P.

(57) ABSTRACT

An adjustable steering column for a motor vehicle includes a clamping device, in the opened state of which the steering column is adjustable and in the closed state of which the set position of the steering column is fixed. The clamping device comprises an actuating lever and a clamping piece, which can be rotated about an axis of rotation by the actuating lever in order to open and close the clamping device. The actuating lever can be twisted about the axis of rotation at least in one direction of rotation with respect to the clamping piece when a limit of a torque acting between the actuating lever and the clamping piece is exceeded.

16 Claims, 7 Drawing Sheets

(56) References Cited

U.S. PATENT DOCUMENTS

| | | | |
|---|---|---|---|
| 5,941,129 A | 8/1999 | Anspaugh et al. | |
| 6,082,216 A | 7/2000 | Watanabe et al. | |
| 7,125,046 B2* | 10/2006 | Sawada et al. | 280/777 |
| 7,415,908 B2* | 8/2008 | Zernickel et al. | 74/493 |
| 2006/0213309 A1 | 9/2006 | Zernickel et al. | |
| 2011/0041642 A1* | 2/2011 | Havlicek | 74/493 |
| 2011/0064538 A1* | 3/2011 | Oertle et al. | 411/360 |
| 2012/0318093 A1* | 12/2012 | Huber | 74/493 |

FOREIGN PATENT DOCUMENTS

| | | |
|---|---|---|
| DE | 101 41 551 | 3/2003 |
| EP | 1 747 966 | 1/2007 |
| FR | 2 779 698 | 12/1999 |
| GB | 2 087 808 | 6/1982 |
| JP | 2000-127987 | 5/2000 |
| WO | 03/018384 | 3/2003 |
| WO | 2004/069629 | 8/2004 |
| WO | 2009/141045 | 11/2009 |

* cited by examiner

ADJUSTABLE STEERING COLUMN FOR A MOTOR VEHICLE

BACKGROUND OF THE INVENTION

The invention relates to an adjustable steering column for a motor vehicle with a clamping mechanism in the opened state of which the steering column is adjustable and in the closed state of which the set position of the steering column is fixed. The clamping mechanism comprises an actuating lever and a clamp element, which, for opening and closing the clamping mechanism, is rotatable by the actuating lever about an axis of rotation.

Adjustable steering columns are known in various embodiments. To secure the adjustment in position in the closed state of the clamping mechanism can be provided, for example, friction faces tightened together by the clamping mechanism for the force-closure securement or toothings, brought together by the clamping mechanism for the form-closure securement. The adjustability can refer to the axial direction of the steering column and/or the inclination adjustment or height direction.

To improve the protection of the motor vehicle driver in the event of a motor vehicle crash, in particular against an impact of the knee on the operating lever of the fixing device, WO 03/018384 A1 has already proposed to realize the operating lever as a deformation element such that it is deformable through an impact with the consumption of energy. For this purpose the operating lever is preferably provided with a specified buckling point. The force leading to the deformation of the operating lever must herein be selected of adequate magnitude in order to exclude deformation during normal operation. The operating lever must further be realized with appropriate geometry in order for a deformation of the operating lever to result due to an impact force acting in the direction toward the motor vehicle front in the event of a crash.

DE 10 141 551 A1 furthermore discloses an adjustable steering column in which a lever part of the operating lever is connected with a bearing part via a tear-off mechanism, through which the lever part can become detached from the bearing part in the event of a crash. The embodiment depicted in this document is relatively complex. It is also necessary to prevent the lever part of the operating lever from becoming unintentionally detached from the bearing part, for example in the presence of an unintentional jolting or improperly applied forces, also in the transverse direction.

U.S. Pat. No. 7,125,046 B2 discloses an adjustable steering column in which, in the event of a crash, the jacket tube can become dislocated in the direction toward the motor vehicle front. Herein, the fastening lever for the lock mechanism is also moved toward the front end of the motor vehicle whereby the knee protection of the driver is said to be improved.

SUMMARY OF THE INVENTION

The invention addresses the problem of providing an adjustable steering column of the type described in the introduction, in which with an advantageous realization an effective protection of the driver with respect to an impact on the actuating lever is attained in the event of a crash. This is accomplished according to the invention through a steering column with the features of the present invention, including advantageous further developments and improvements of the invention.

In the steering column of the invention, the actuating lever is connected with the clamp element of the clamping mechanism so that it is turnable out of position at least in one direction of rotation with respect to the clamp element if a limit value of a torque acting between the actuating lever and the clamp element is exceeded. Below this limit value of torque, there is advantageously a torsion-tight connection between the actuating lever and the clamp element. The actuating lever can herein be connected directly or indirectly, e.g. via one or more transmission members such that it is connected torsion-tight with the clamp element. However, this connection is only torsion-tight up to a certain torque acting between the actuating lever and the clamp element. If this limit value is exceeded (in particular in the event of a motor vehicle crash if the driver impacts, for example, with his knee onto the actuating lever) the actuating lever can at least within limits turn out of position with respect to the clamp element with the detaching or yielding of the torsion-tight connection. After this limit value of the effective torque has been exceeded, there is advantageously potential for movement of the actuation level only in a degree of freedom, precisely in the sense of a rotation with respect to the clamp element.

The invention permits a simple and compact realization. In the realization according to the invention, a relatively high nonresponsiveness can advantageously be attained to unintentional or improper force actions onto the actuating lever, in particular also in the transverse direction, e.g. in the direction of the rotational axis.

The limit value of the torque, above which the actuating lever is turnable out of position with respect to the clamp element, is advantageously at least 7.5 Nm, wherein a value of at least 12 Nm is more preferred. In order to obtain sufficient security even in the case of improper use, limit values of the torque, above which the actuating lever is turnable out of position with respect to the clamp element, of at least 15 Nm is especially preferred.

Depending on the position and orientation of the actuating lever, the limit value must be laid out such that even improper forces or an unintentional supporting of the driver on the lever does not lead to a detaching of the torsion-tight connection. However, this does not represent a hindrance, since in the event of a crash the driver, through his relative speed with respect to the motor vehicle, introduces an elevated force and therewith a corresponding torque.

In a preferred embodiment of the invention, at least as long as the limit value of the torque acting onto the actuating lever has not been exceeded, there is a connection under form closure, acting at least in one rotational direction about the rotational axis, between the actuating lever and the clamp element. This form-closure connection is preferably effective about the rotational axis in both rotational directions. This form-closure connection can be realized directly between the actuating lever and the clamp element or indirectly via one or more intermediate members. Referring to the at least one rotational direction, preferably to both rotational directions. The intermediate members are each connected with one another under form closure. If the limit value has been exceeded, the form-closure connection yields or becomes detached. This detachment or yielding can take place by at least one of the parts effecting the form closure being broken off and/or deformed. This may herein involve a part of the actuating lever and/or of the clamp element and/or at least one intermediate part which imparts the form closure, for example a connecting stud that can be sheared off. If the connection yields or becomes detached through deformation, this deformation is preferably plastic or at least largely plastic. The deformation can be, for example, a widening-out.

Conceivable and feasible, although less preferred, would also be a force-closure, in particular friction-closure, connection between the actuating lever and the clamp element which retains the actuating lever nonturnable out of position with respect to the clamp element at torques acting below the limit value. A defined realization of a limit value which is substantially constant over the service life, however, is here more difficult.

The actuating lever is advantageously disposed such that a torque which, in the event of a crash, is exerted by the driver, for example his knee, onto the actuating lever when the driver is hurled in the direction toward the motor vehicle front, acts in the rotational closure direction of the actuating lever, which is the rotational direction into which the actuating lever is swivelled about the rotational axis during the closure of the clamping mechanism.

In an advantageous embodiment of the invention, the turning out of position of the actuating lever with respect to the clamp element, if a torque is effective that is above the limit value, takes place at least over an angular range with the absorption of energy (thus not as an abrupt complete detachment. This angular range is preferably greater than 10°. The safety against unintentional or improper force actions can thereby be increased.

The adjustable steering column according to the invention can comprise in a conventional manner a support unit is connectable with the chassis of the motor vehicle, and a setting unit rotatably bearing supporting the steering spindle. In the opened state of the clamping mechanism, the steering spindle is displaceable with respect to the support unit for setting the position of the steering column and, in the closed state of the clamping mechanism, is secured in position in its set position with respect to the support unit. This setting unit can be formed in particular by a jacket tube rotatably supporting the steering spindle or it can include such.

If, upon exceeding the limit value of the torque acting between the actuating lever and the clamp element, the actuating lever is turned out of position with respect to the clamp element, the clamping mechanism remains preferably closed. The clamp element thus does not turn out of position, and it is stayed against a turning by a corresponding stop. If, correspondingly, the clamping mechanism herein remains clamped, the steering column, corresponding to the layout of the clamping mechanism, can absorb forces with respect to its displacement directions. These forces can in particular be laid out so high that the steering column, in the event of a crash, through an impact of the driver, is not dislocated with respect to the support unit and, for example, the function of the airbag is fully ensured. In this manner, on the one hand, the endangerment through the actuation lever is decreased and, on the other hand, the energy upon the impact of the driver onto the steering column, as is known within prior art, can be absorbed under control by absorption elements between support unit and body-stationary bracket.

In the opened state of the clamping mechanism, the steering column can be adjustable in its longitudinal direction and/or in its inclination or in its height.

If the torque acting between the actuating lever and the clamp element exceeds the limit value, this is denoted as a "crash event". As long as this limit value is not exceeded, this state is referred to as "normal operation" of the steering column.

BRIEF DESCRIPTION OF THE DRAWINGS

Further advantages and details of the invention will be explained in the following section in conjunction with the attached drawings, in which.

DETAILED DESCRIPTION OF THE INVENTION

A first embodiment of the invention will be explained in the following section in conjunction with FIGS. 1 to 11. The steering column comprises a support unit 1, which is connectable to the chassis of the motor vehicle, and a setting unit 2, which rotatably bearing supports a section of the steering spindle 3 adjoining the steering wheel-side end of the steering column. The setting unit 2 is realized in the form of a jacket tube.

In the opened state of a clamping mechanism 4, the setting unit 2 is displaceable in the longitudinal direction 5 of the steering column (=in the direction of the longitudinal axis of the steering spindle 3) for a length adjustment of the steering column and in the setting direction 6 for a height or inclination adjustment of the steering column with respect to the support unit 1. In the closed state of the clamping mechanism 4, the set position of the setting unit 2 is secured in position with respect to the support unit 2. To secure the adjustment, for example, as depicted, meshing toothings 8-11 are provided. For the securement, instead, friction faces can also be provided. Other securement elements acting under form closure are also known and can be employed. Moreover, for the securement, combinations of elements acting under form closure and friction closure can also be employed. To increase the number of friction faces, disks cooperating in the manner of disk packs can also be provided. The toothings and/or other securement elements can be provided on one side or both sides with respect to the center longitudinal axis (to illustrate the bilateral disposition, in FIG. 1 on both sides on the setting unit 2 a toothing is depicted, while the other toothings, for the sake of simplicity, are only shown on one side). All of these implementations are known.

Figure 1:
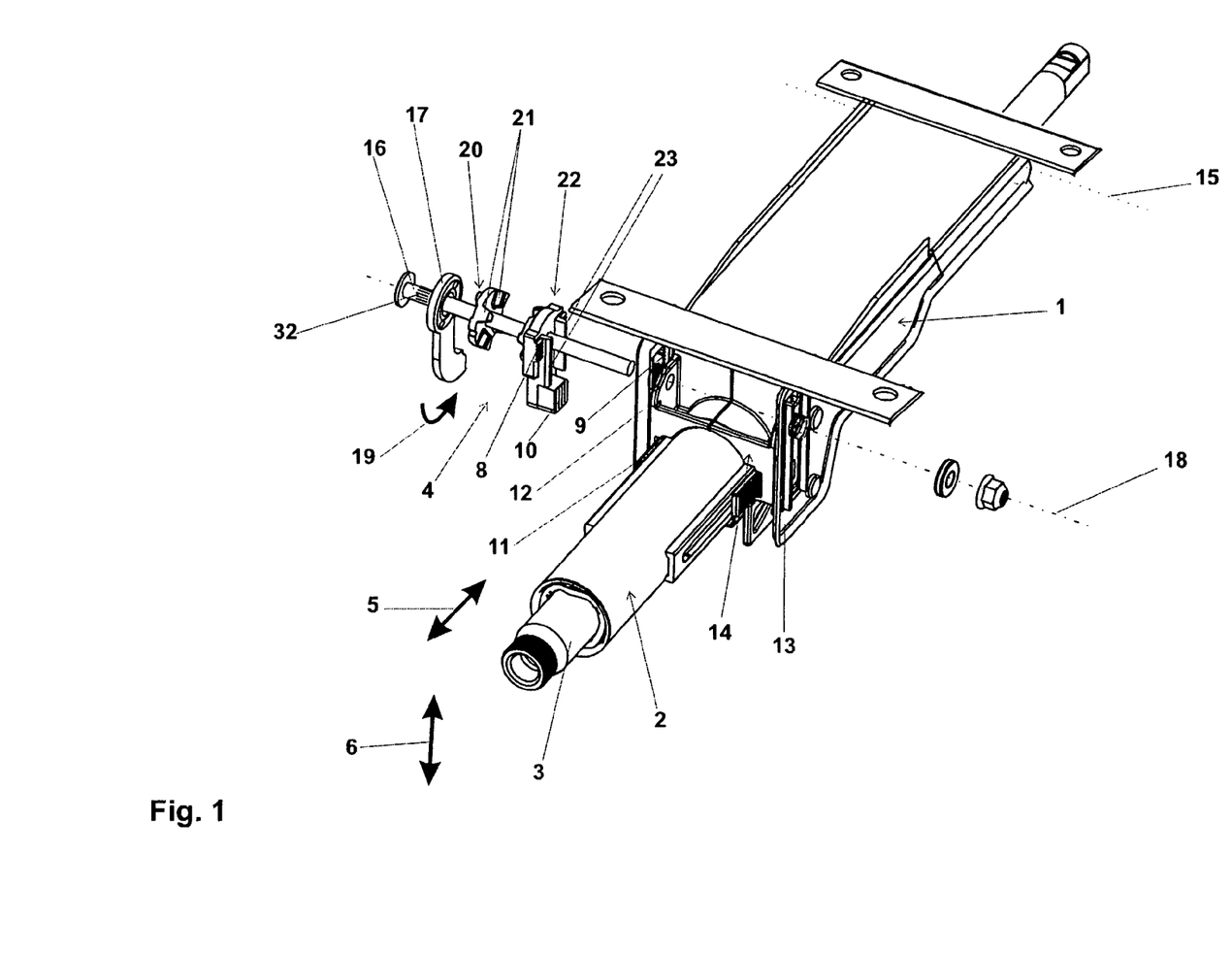
FIG. 1 is an oblique view of a feasible embodiment of a steering column according to the invention, parts of the clamping mechanism being pulled apart in the manner of an exploded view.
Figure 2:
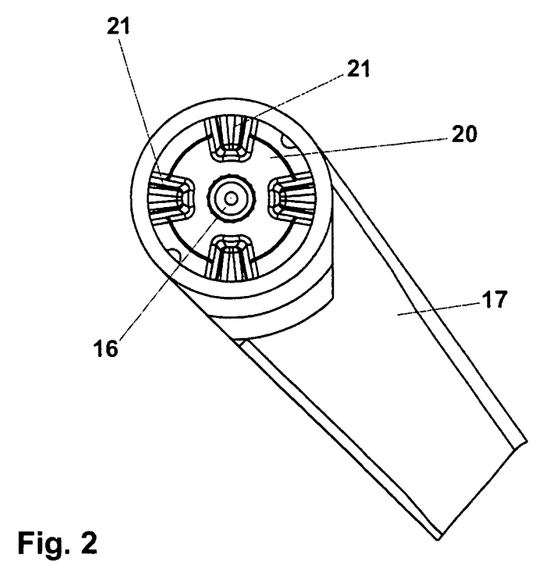
FIG. 2 is a view of the actuating lever with the clamp element and the clamp bolt.
Figure 3:
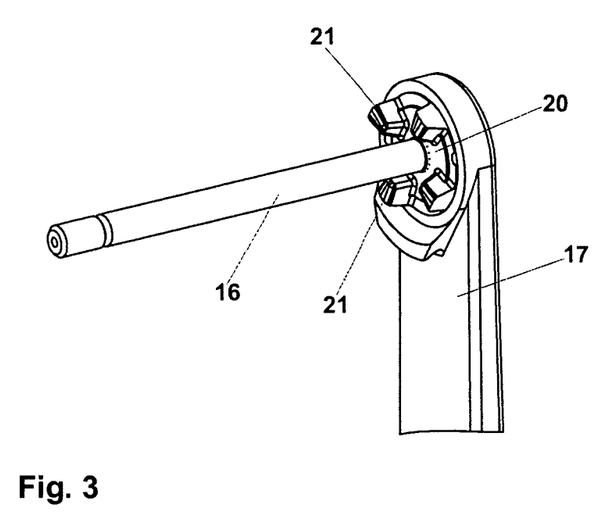
FIG. 3 is an oblique view of these parts.

The setting unit 2 is disposed between side jaws 12, 13 of the support unit 1. In the depicted embodiment, further, between the support unit 1 and the setting unit 2, an intermediate unit 14 is disposed. In the opened state of the clamping mechanism 4, the intermediate unit 14 is displaceable with respect to the support unit 1 in the setting direction 6 corresponding to the height or inclination adjustment. For this purpose, it is swivellable with respect to the support unit 1 about a swivel axis 15, the implementation of which is not shown in detail in the depicted embodiment. In the longitudinal direction 5 of the steering column, the intermediate unit 14 is nonshiftable with respect to the support unit 1. In the opened state of the clamping mechanism 4, further, the setting unit 2 is displaceable in the longitudinal direction 5 with respect to the intermediate unit 14 for the length setting of the steering column. In the setting direction 6, the setting unit 2 is nondisplaceable with respect to the intermediate unit 14.

In the closed state of the clamping mechanism 4 the side jaws 12, 13 of the support unit 1 are tightened against the intermediate unit 14.

It is herein feasible to form the connection of the support unit 1 with the chassis of the motor vehicle and/or the connection of the intermediate unit 14 with the support unit 1 and/or the connection of the setting unit 2 with the intermediate unit 14 through the interconnection of known crash energy absorption devices. Since the energy absorption of the steering column in the event of a crash is not the core of the invention, such mechanisms are here not further described. However, a person of skill in the art can select suitable mechanisms from the techniques for energy absorption according to his own discretion and, combined with the solution according to the invention, integrate such into a steering column.

The realization with a support unit 1, setting unit 2 and interspaced intermediate unit 14 in the described form is known. Such an intermediate unit 14 could also be omitted, as is also known. In the closed state of the clamping mechanism 4 the side jaws 12, 13 in this case are pressed directly onto the setting unit 2.

The clamping mechanism 4 comprises a clamp bolt 16 extending transversely to the steering spindle 3, in particular at right angles to the longitudinal direction 5 of the steering column, and the clamp bolt penetrates openings in the side jaws 12, 13. To permit height or inclination adjustment, the openings penetrated by clamp bolt 16 in the side jaws 12, 13 are realized as elongated holes extending in the setting direction 6. The clamp bolt 16 further penetrates openings in the intermediate unit 14. It could also penetrate openings in the setting unit 2, in particular in embodiments in which an intermediate unit 14 is omitted. These openings in the setting unit 2, to permit a length adjustment of the steering column, would be realized as elongated holes extending in the longitudinal direction 5.

A steering column according to the invention could also only be adjustable in the longitudinal direction 5 or only in the setting direction 6 corresponding to the height or inclination adjustment.

To open and close the clamping mechanism 4, an actuating lever 17 actuatable by the user is provided. To close the clamping mechanism 4, the actuating lever 17, starting from an open position (FIG. 4) is swivelled about the rotational axis 18, formed by the clamp bolt 16, into a rotational closing direction 19 up into a closed position (cf. FIG. 6). During its swivelling about the rotational axis 18 from its open into its closed position, the actuating lever 17 entrains a clamp element 20, which, in the depicted embodiment, is realized in the form of a cam disk with at least one cam 21, and preferably at least two cams 21. During the rotation of the actuating lever 17 from its open into its closed position, the clamp element 20 is rotated about the rotational axis 18 from a passive position (FIG. 4), in which the clamping mechanism is opened, in the rotational closed direction 19 into an active position (FIG. 6), in which the clamping mechanism 4 is closed.

The clamp element 20 cooperates with a counterclamp element 22 which is held nonturnable out of position about the rotational axis 18, in the depicted embodiment through guide bars 23, cooperating with the side jaw 12, which are displaceably guided by the side jaw 12 (for example the margins of the opening penetrated by the side jaw on which they are in contact) into the setting direction 6. The counterclamp element 22 in the depicted embodiment is realized in the form of a rotatably actuated sliding disk or a cam follower and includes at least one oblique face 24 for the cooperation with the at least one cam 21 of the clamp element 20.

Figure 4:
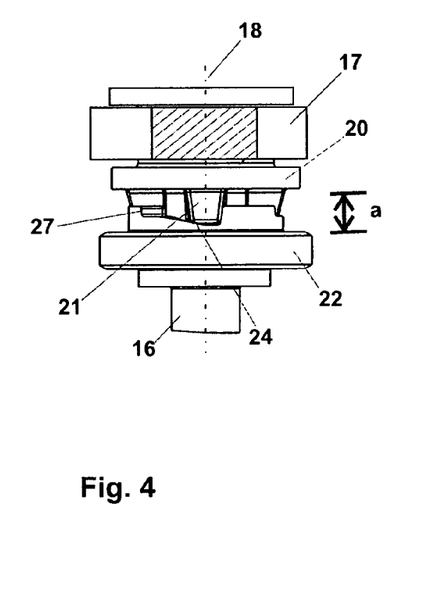
FIG. 4 is a side view of the actuating lever with the clamp element, the counterclamp element, and the clamp bolt in the opened state of the clamping mechanism, the actuating lever and the clamp bolt partially cut off.
Figure 5:
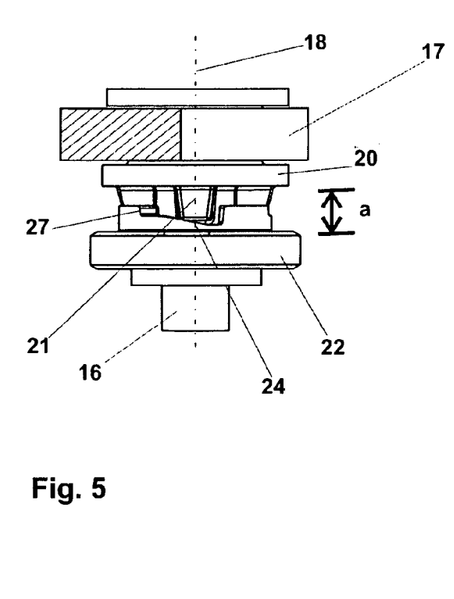
FIG. 5 is a view corresponding to FIG. 4 in the partially closed state of the clamping mechanism.
Figure 6:
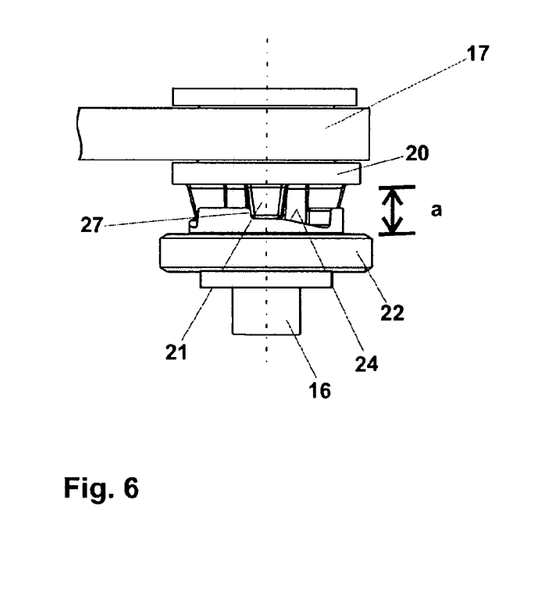
FIG. 6 is a view corresponding to FIG. 4 in the closed state of the clamping mechanism.
Figure 7:
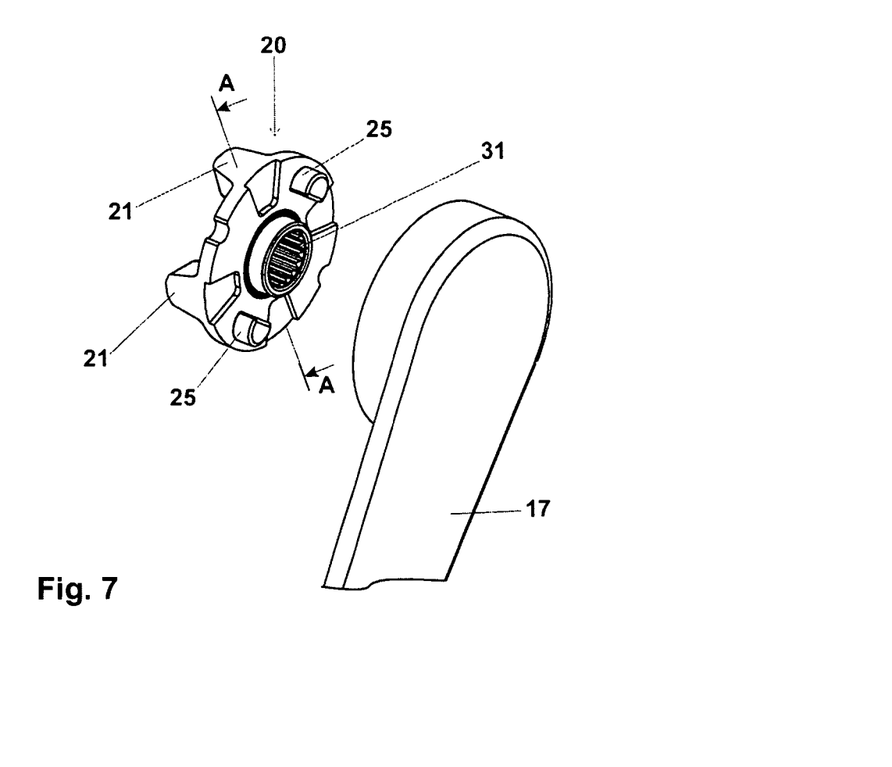
FIG. 7 is an oblique view of the actuating lever and of the clamp element in a state in which these parts are pulled apart.
Figure 8:
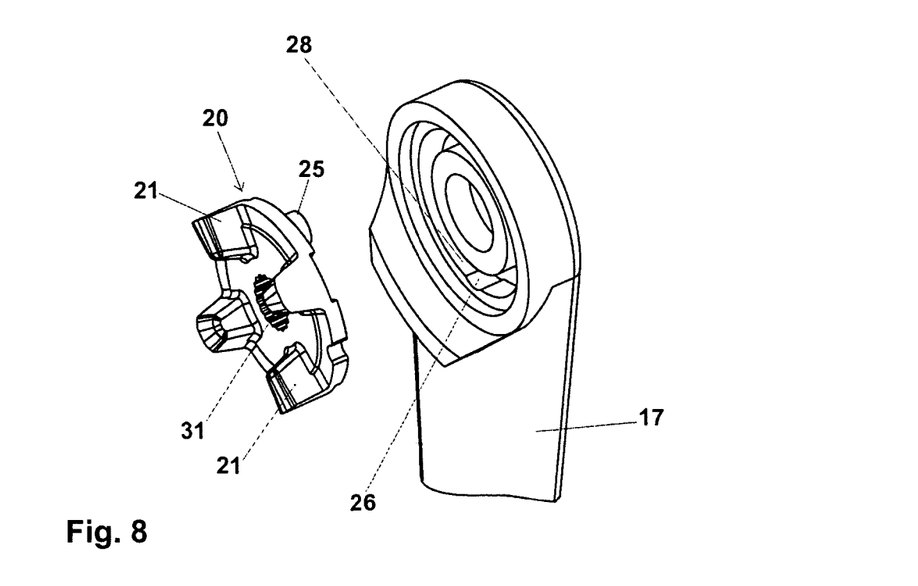
FIG. 8 is an oblique view of the parts of FIG. 7 from a different line of sight.
Figure 9:
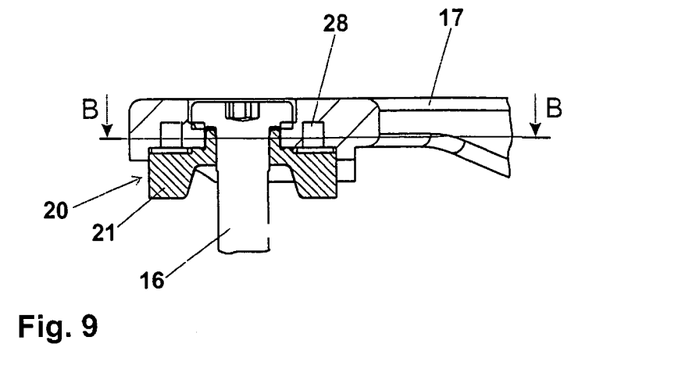
FIG. 9 is a section view along line AA of FIG. 7 (however, with the two components assembled together)
Figure 10:
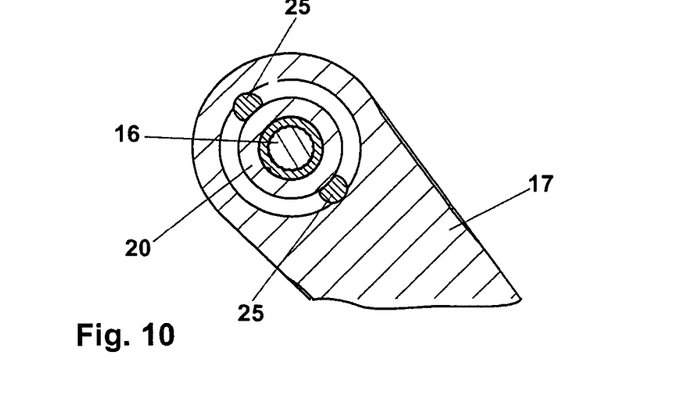
FIG. 10 is a section view along line BB of FIG. 9.

During the turning of the clamp element 20 from its passive into its active position, the clamp element 20 and the counterclamp element 22 are spaced further apart, e.g. the distance a between its base sections increases, as is evident in FIGS. 4 to 6. Consequently, at least one of these parts 20, 22 is shifted in the axial direction of the rotational axis 18.

The opening and closing of a clamping mechanism 4 in this manner by means of a clamp element 20 and counterclamp element 22 is known. It is also feasible to provide the converse disposition, e.g. the counterclamp element 22 includes at least one cam and the clamp element 20 is realized as a sliding disk or cam follower and includes at least one oblique face for the cooperation with the at least one cam. In addition, other realizations of clamp elements 20, 22 for opening and closing the clamping mechanism 4 through axial shifting of at least one of these parts during the turning out of position of the clamp element 20 with respect to the counterclamp element 22 are conceivable and feasible and also known. Between the clamp element 20 and the counterclamp element 22 could also be disposed in known manner rocker arms or rolling bodies which run in guide tracks, of which at least one includes an inclined bottom.

When the clamp element 20 is in its active position, further turning of the clamp element 20 into the rotational closed direction 19 is blocked. In the depicted embodiment for this purpose, the at least one cam 21 is in contact on a stop 27 of the counterclamp element 22. This stop 27 is formed by a step at the end of a guide face comprising the oblique face 24 for the cam 21.

In the depicted embodiment, a rotational entrainment connection, required for opening and closing the clamping mechanism 4, between the actuating lever 17 and the clamp element 20 is carried out through connection studs 25, which are integrally realized with the clamp element 20 or are retained by the clamp element 20, for example, by being pressed into recesses in the clamp element 20. The axes of the connection studs 25 are oriented parallel to the rotational axis 18 and are spaced apart from it. For example, two connection studs 25 are provided, located opposite in particular with respect to the rotational axis 18. More or fewer of such connection studs 25 can also be provided. The connection studs 25 project into recesses 26 of the actuating lever 17 in which they are retained under form closure with respect to the actuating lever 17 with reference to a movement in the sense of a rotation about the rotational axis 18, cf. in particular FIG. 8 in connection with FIG. 10.

Figure 11:
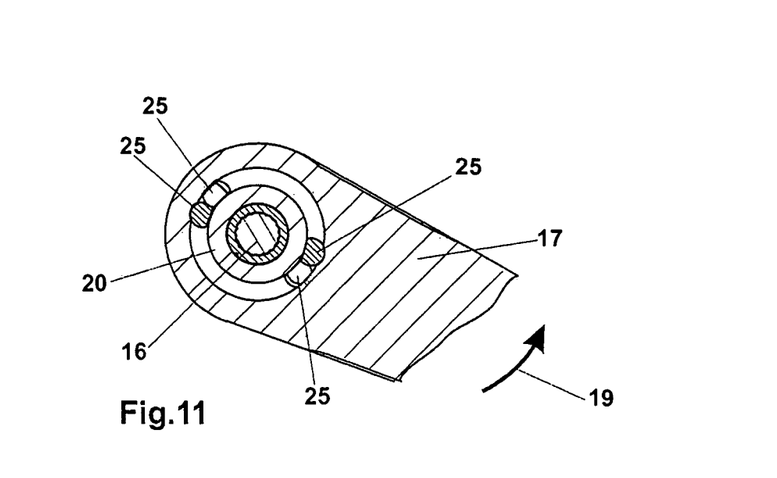
FIG. 11 is a section view corresponding to FIG. 10 after a motor vehicle crash according to a first embodiment variant.

If in the closed position of the actuating lever 17, a force acts onto it which leads to a torque in the rotational closed direction 19, which force exceeds a certain limit value, shearing-off of the connection studs 25 occurs. Therefore, the form-closure connection between the actuating lever 17 and the clamp element 20 is abrogated and the actuating lever 17 can become further swivelled in the rotational closing direction 19. This state is depicted in FIG. 11. The clamping mechanism 4 herein remains closed such that the set position of the steering column is maintained. Even after the turning out of position with respect to the clamp element 20, the actuating lever 17 remains disposed on the clamp bolt 16 via the head of the clamp bolt 16 or a part retained on the clamp bolt 16.

To permit the shearing-off of the connection studs 25, these are in particular comprised of synthetic material.

The converse embodiment is also conceivable and feasible, in which the connection studs 25 are realized integrally with the actuating lever 17 or are retained by the actuating lever 17, for example by being pressed into recesses in the actuating lever 17. The studs 25 project into recesses of the clamp element 20 in which they are retained under form closure with respect to the clamp element 20 in reference to a movement in the sense of a rotation about the rotational axis 18.

The clamp element 20 is preferably connected torsion-tight with the clamp bolt 16. The clamp bolt 16 thus rotates simultaneously during the rotation of the clamp element 20 about the rotational axis 18. This connection can take place, for example via a knurl 31, 32 or a roller-burnishing which is disposed on the clamp element 20 and/or on the clamp bolt 16. Other connections under force closure, in particular frictional closure and/or form closure and/or material closure, are also conceivable and feasible. Conceivable and feasible would in principle also be an integral realization of the clamp bolt 16 with the clamp element 20.

An embodiment is also conceivable and feasible in which the clamp element 20 is turnable out of position with respect to the clamp bolt 16. During the opening and closing of the clamping mechanism 4, the clamp bolt can also remain without rotation about its axis.

Apart from its connection with the clamp element 20, the actuating lever 17 can rotate unhindered on the clamp bolt 16 about the rotational axis 18.

The toothings 8, 10, displaced by the clamping mechanism 4 during the opening and closing of the clamping mechanism 4, are disposed in the depicted embodiment on the counterclamp element 22 or a part connected therewith and cooperate with a toothing 9 located on the side jaw 12 and a toothing 14 of a part connected with the setting unit 2. This part is connected with the setting unit 2 for example such that, in the presence of a force acting in the longitudinal direction 5 of the steering column onto the setting unit 2 in the event of a crash, it is dislocatable with respect to the setting unit 2 with the absorption of energy. Other dispositions of toothings or other securement parts are also conceivable and feasible and also known.

Securement elements, such as toothings, brought into engagement with one another in the closed state of the clamping mechanism 4, can be provided on one side, e.g. on one side of the longitudinal axis of the steering spindle 3 (as shown), or on both sides.

As known are embodiments in which the clamp bolt is entirely located on one side of the longitudinal axis of the steering spindle 3, in which its end closer to the longitudinal axis of the steering spindle 3 is disposed within the jacket tube. Such a realization is also conceivable and feasible.

Figure 12:
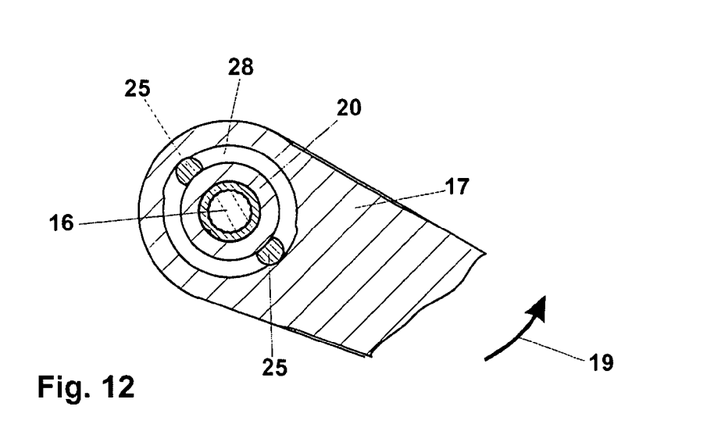
FIG. 12 is a section view corresponding to FIG. 10 after a motor vehicle crash according to a second embodiment variant.

A second embodiment of the invention, which differs in view of the overcoming of the form closure between the actuating lever 17 and the clamp element 20 in the event of a crash, will be explained in the following. During normal operation, thus as long as the limit value of the torque acting between the actuating lever 17 and the clamp element 20 has not been exceeded, this embodiment is realized as depicted in FIGS. 1 to 10 and previously described. When the limit value is exceeded, however, the shearing-off of the connection studs 25 does not occur, as is depicted in FIG. 11. However, the form closure blocking the turning out of position of the actuating lever 17 with respect to the clamp element 20 is rather overcome through material reformation, as is depicted in FIG. 12. The recesses 26, into which the connection studs 25 project in normal operation and are retained under form closure, here represent expanded regions of a groove-form guide track 28 for the particular connection studs 25.

If, in the closed position of the actuating lever 17, a force acts onto it which leads to a torque into the rotational closed position 19, which torque exceeds a certain limit value, the actuating lever 17 is turned with respect to the clamp element 20, and in each instance a section of the guide track that adjoins the recess 26 is widened out. The turning out of position of the actuating lever 17 with respect to the clamp element 20, thus, starting from the staring position, takes place under continuous energy absorption (in the depicted embodiment, the rotation range over which such energy absorption takes place is theoretically 180°; however, such a large turning out of position is not likely to occur in practice).

The actuating lever 17 is preferably comprised, at least in the region of the guide track 28 or also entirely, of synthetic material.

Figure 13:
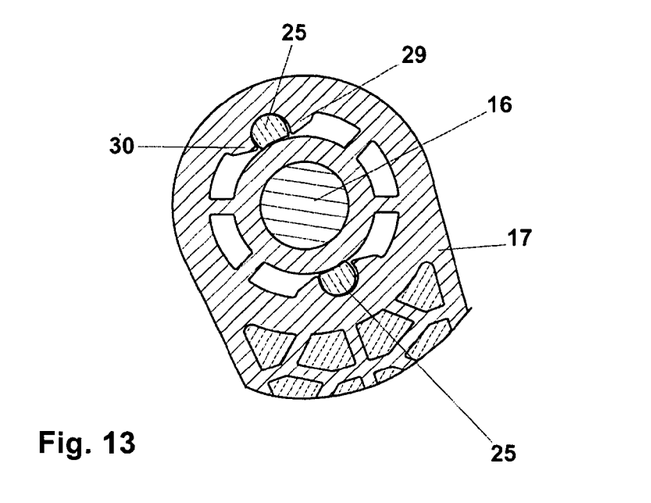
FIGS. 13 and 14 are section views corresponding to FIG. 10 before and after a motor vehicle crash according to a further embodiment of the invention, with a modified actuating lever.
Figure 14:
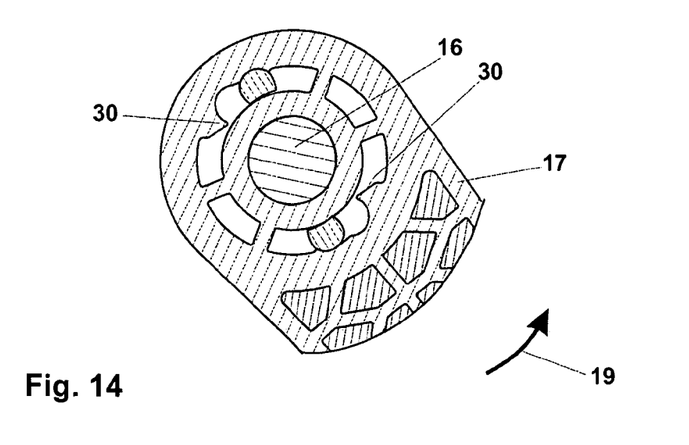

A further modified embodiment is depicted in FIGS. 13 and 14. Compared to the first embodiment described in conjunction with FIGS. 1 to 11 and the second embodiment example described in conjunction with FIG. 12, again, only the type of form-closure connection between the actuating lever 17 and the clamp element 20 is modified. On both sides of each particular connection stud 25, which is integrally realized with the clamp element 20 or is retained by it, for example, so that it is pressed into a recess in the clamp element 20, projections 29, 30 are provided which decrease the cross section of the guide track 28 of the actuating lever 17 and encompass the connection stud 25. When the torque acting between the actuating lever 17 and clamp element 20 in the rotational closed direction 19 exceeds the limit value, the projections 29, blocking the turning out of position of the actuating lever 17 are deformed so that the actuating lever 17 can rotate further. After the deformation, permitting the turning out of position of the actuating lever 17, of the projections 29, the further turning of the actuating lever 17, wherein the connection studs 25 dislocate in the particular guide track 28, can take place without or with a lesser energy absorption.

In the case of the embodiments described in conjunction with FIGS. 12 or 13 and 14, again, the converse embodiment is feasible, in which the connection studs 25 are integral with the actuating lever 17 or are retained by the actuating lever 17, for example, so that they are pressed into recesses in the actuating lever 17. The recesses 26 and the guide track 28, or the projections 29, 30 decreasing the cross section of each particular guide track 28, would in this case be provided on the clamp element 20.

In principle, even if less preferred, the arrangement according to the invention can also be realized such that, in the event of a crash, upon the impact of the driver onto the actuating lever 17, the latter turns out of position in the direction in which the clamping system is opened. And only after the actuating lever 17 has turned further during this rotation up to a stop, the torsion-tight connection with the clamp element is abrogated according to the invention. In this case, the steering column in the event of a crash can readily be pressed away by the driver, since the fixing between setting unit 2 and support unit 1 is abrogated. Such an embodiment can be employed, for example, if other energy absorption mechanisms, such as additional airbags or cushioning are provided in the motor vehicle region surrounding the steering column.

Figure 15:
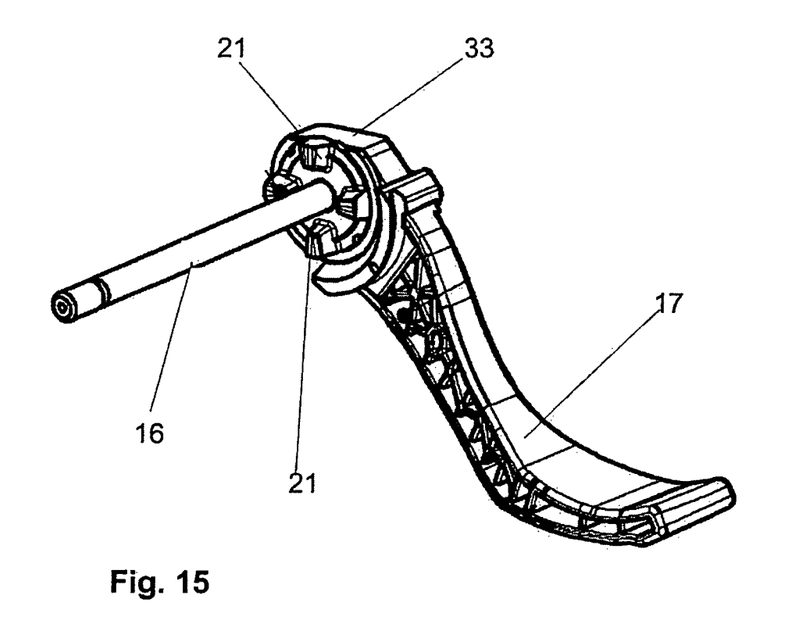
FIG. 15 shows a further minimally modified embodiment according to the invention.

A further, minimally modified embodiment is depicted in FIG. 15. The actuating lever 17 is here provided with a flattened section 33 in order to attain in this region sufficient clearance with respect to neighboring structural parts.

In the previously described embodiments, the actuating lever 17 is realized with a recess (cf. for example FIG. 8), which has a central axis, coinciding with the rotational axis 18, about which the clamp element 20 is rotated by the actuating lever 17 during the opening and closing of the clamping mechanism. If, upon exceeding the limit value of the torque acting between the actuating lever 17 and the clamp element 20, the actuating lever 17 is turned out of position with respect to the clamp element 20, the central axis of this recess herein continues to coincide with the rotational axis 18 as before. Equivalent thereto would be an embodiment in which the actuating lever 17 is provided with a pin or stud which has a central axis coinciding with the rotational axis 18 about which the clamp element 20 is rotated by the actuating lever 17 during the opening and closing of the clamping mechanism 4. The central axis of the pin or the stud coincides as before with the rotational axis if the actuating lever 17, upon the limit value of the torque acting between the actuating lever 17 and the clamp element 20 being exceeded, is turned out of position with respect to the clamp element about the rotational axis 18. An embodiment of this last described form is also conceivable and feasible.

Legend to the Reference Numbers
1 Support unit
2 Setting unit
3 Steering spindle
4 Clamping mechanism
5 Longitudinal direction
6 Setting direction
8 Toothing
9 Toothing
10 Toothing
11 Toothing
12 Side jaw
13 Side jaw
14 Intermediate unit
15 Swivel axis
16 Clamp bolt
17 Actuating lever
18 Rotational axis
19 Rotational closed direction
20 Clamp element
21 Cam
22 Counterclamp element
23 Guide bar
24 Oblique face
25 Connection studs
26 Recess
27 Stop
28 Guide track
29 Projection
30 Projection
31 Knurl
32 Knurl
33 Flattening

The invention claimed is:

1. An adjustable steering column for a motor vehicle, comprising:
   a clamping mechanism, in the opened state of which the steering column is adjustable and in the closed state of which the set position of the steering column is fixed,
   wherein the clamping mechanism comprises an actuating lever and a clamp element, which is rotatable by the actuating lever about a rotational axis for opening and closing the clamping mechanism,
   wherein, when a limit value of a torque acting between the actuating lever and the clamp element is exceeded, the actuating lever is turnable out of position with respect to the clamp element about the rotational axis in at least one rotational direction;
   wherein the actuating lever is rotated about the rotational axis in a rotational closed direction and the clamp element is entrained by the actuating lever in the rotational closed direction to close the clamping mechanism,
   wherein the clamp element in the closed state of the clamping mechanism is blocked against a further rotation in the rotational closed direction.

2. The adjustable steering column of claim 1, wherein the rotational axis about which the clamp element and the actuating lever are rotatable for opening and closing the clamping mechanism is oriented transversely to the longitudinal direction of the steering column.

3. The adjustable steering column of claim 1, wherein the rotational axis about which the clamp element and the actuating lever are rotatable for opening and closing the clamping mechanism is formed by a clamp bolt of the clamping mechanism, the clamp element and the actuating lever being disposed on the clamp bolt.

4. The adjustable steering column of claim 3, wherein, during a turning out of position of the actuating lever with respect to the clamp element after the limit value of the torque acting between the actuating lever and the clamp element is exceeded, the actuating lever remains disposed on the clamp bolt.

5. The adjustable steering column of claim 1, further comprising a counterclamp element,
   wherein the clamp element cooperates with the counterclamp element, and the counterclamp element is not rotatable with respect to the rotational axis,
   wherein the clamp element and/or the counterclamp element shifts or shift in the axial direction of the rotational axis during the opening and closing of the clamping mechanism.

6. The adjustable steering column of claim 1, wherein the clamp element is stayed on a stop of the counterclamp element against a further rotation in the rotational closed direction in the closed state of the clamping mechanism.

7. The adjustable steering column of claim 4, wherein the actuating lever is turnable out of position at least in the rotational closed direction with respect to the clamp element when a limit value of a torque acting between the actuating lever and the clamp element is exceeded.

8. The adjustable steering column of claim 1, wherein a connection acting in both rotational directions under form closure is formed between the actuating lever and the clamp element, and the connection yields when the limit value of the torque acting between the actuating lever and the clamp element is exceeded.

9. The adjustable steering column of claim 8, wherein the form-closure connection includes at least one connection stud extending parallel to the rotational axis and spaced apart therefrom.

10. The adjustable steering column of claim 9, wherein the actuating lever or the clamp element has at least one circular arc-shaped guide track along which the at least one connection stud can travel during a turning out of a position of the actuating lever with respect to the clamp element while overcoming its form-closure retention.

11. The adjustable steering column of claim 5, wherein the clamp element includes at least one cam which cooperates with an oblique face of the counterclamp element for opening and closing the clamping mechanism.

12. The adjustable steering column of claim 1, wherein the clamp element is connected torsion-tight with a clamp bolt of the clamping mechanism.

13. The adjustable steering column of claim 5, the counterclamp element includes at least one cam which cooperates with an oblique face of the clamp element for opening and closing the clamping mechanism.

14. The adjustable steering column of claim 1, wherein the actuating lever is connected to the clamp element with a connection that yields when the limit value of the torque acting between the actuating lever and the clamp element is exceeded.

15. The adjustable steering column of claim 1, wherein the clamping mechanism remains in the closed state after the limit value of the torque is exceeded and the actuating lever has rotated relative to the clamp element.

16. The adjustable steering column of claim 1, further comprising a counterclamp element,
   wherein the clamp element cooperates with the counterclamp element, and the counterclamp element is not rotatable with respect to the rotational axis,
   wherein the clamp element and/or the counterclamp element shifts or shift in the axial direction of the rotational axis during the opening and closing of the clamping mechanism, and
   wherein the clamping mechanism remains in the closed state after the limit value of the torque is exceeded and the actuating lever has rotated relative to the clamp element.

* * * * *